US008340207B2

(12) United States Patent
Li et al.

(10) Patent No.: US 8,340,207 B2
(45) Date of Patent: Dec. 25, 2012

(54) DIFFERENTIAL FEEDBACK SCHEME FOR CLOSED-LOOP MIMO BEAMFORMING

(75) Inventors: Qinghua Li, San Ramon, CA (US); Xintian Eddie Lin, Palo Alto, CA (US); Yuan Zhu, Yang District (CN)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 12/770,620

(22) Filed: Apr. 29, 2010

(65) Prior Publication Data
US 2011/0064158 A1 Mar. 17, 2011

Related U.S. Application Data

(60) Provisional application No. 61/173,939, filed on Apr. 29, 2009.

(51) Int. Cl.
*H04B 7/02* (2006.01)
(52) U.S. Cl. ........................................................ 375/267
(58) Field of Classification Search .................. 375/267, 375/260, 132, 242
See application file for complete search history.

(56) References Cited

U.S. PATENT DOCUMENTS

| 6,718,502 | B1 * | 4/2004 | Kuznetsov et al. | 714/755 |
| 2004/0161105 | A1 * | 8/2004 | Park et al. | 380/28 |
| 2008/0080459 | A1 * | 4/2008 | Kotecha et al. | 370/342 |
| 2008/0219373 | A1 | 9/2008 | Zhang et al. | |
| 2009/0066577 | A1 | 3/2009 | Kim et al. | |
| 2010/0056216 | A1 * | 3/2010 | Li et al. | 455/562.1 |

FOREIGN PATENT DOCUMENTS

WO 2010/127183 A1 11/2010

OTHER PUBLICATIONS

International Search Report and Written Opinion received for PCT Patent Application No. PCT/US2010/033061, mailed on Aug. 25, 2010, 8 pages.
International Preliminary Report on Patentability received for PCT Patent Application No. PCT/US2010/033061, mailed on Nov. 10, 2011, 4 pages.

\* cited by examiner

*Primary Examiner* — Jaison Joseph
(74) *Attorney, Agent, or Firm* — Alan Pedersen-Giles

(57) ABSTRACT

A first N×M codebook of a first rank M may be used to generate a second N×(N−M) codebook of a second rank (N−M). This second codebook is both orthogonal and complementary to the first codebook. In practice, this may reduce storage requirements in closed-loop MIMO beamforming, because the second codebook may be dynamically generated as needed by a base station and/or a mobile station. In some cases, a higher rank beamforming matrix or precoding matrix may be formed from a lower rank (e.g., one or two) beamforming matrix or precoding matrix. Also, a novel way to generate the rotation matrix $Q_{v(t-1)}$ is disclosed.

14 Claims, 4 Drawing Sheets

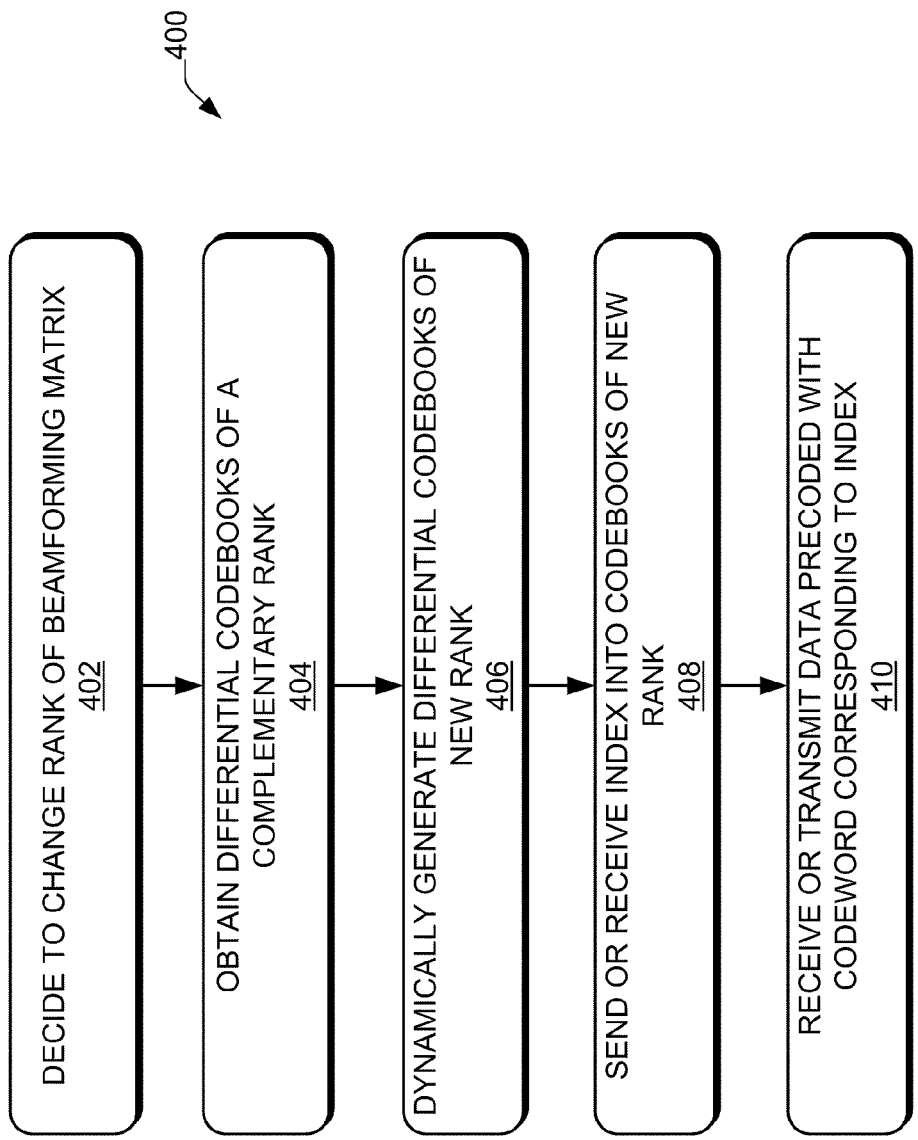

US 8,340,207 B2

DIFFERENTIAL FEEDBACK SCHEME FOR CLOSED-LOOP MIMO BEAMFORMING

CROSS-REFERENCE TO RELATED APPLICATIONS

The present application claims the benefit of U.S. provisional application Ser. No. 61/173,939, filed Apr. 29, 2009, the entire content of which is incorporated by reference herein.

The present application is also related to U.S. application Ser. No. 12/658,105, filed Feb. 2, 2010, the entire content of which is incorporated by reference herein.

BACKGROUND

Implementations of the claimed invention generally may relate to wireless communications, and in particular to beamforming in wireless communication networks.

In the downlink of closed-loop multiple input/multiple output (MIMO) beamforming in a wireless network comprising a subscriber station and a base station (BS), the subscriber station (also referred to at times herein as a mobile station (MS) or user equipment (UE)) quantizes the ideal beamforming matrix and sends a quantization index corresponding to the ideal beamforming matrix back to the base station (also referred to at times herein as a transmitter or enhanced node B (eNB)). The base station reconstructs the beamforming matrix according to the fed-back index and conducts the beamforming. Similarly, in the uplink, the base station quantizes the ideal beamforming matrix and the subscriber station reconstructs beamforming matrix according to the feedback. It is well known that beamforming increases the link performance and system throughput.

The beamforming matrix can be fed back differentially. The change between the current beamforming matrix and the previous one can be quantized by a codebook and the corresponding quantization index can be fed back. The quantization codebook determines the beamforming accuracy and tracking capability. The differential feedback can be applied across time and/or frequency.

Embodiments of the invention may find application in a wireless local area network (WLAN) or a wireless wide area network (WWAN) including a WiMAX (Worldwide Interoperability for Microwave Access) network or the like. WiMAX technology is based on the IEEE 802.16 family of standards, including IEEE 802.16e, IEEE 802.16m, and others. The invention herein may also be applicable to other WWANs such as those operating according to 3GPP Long Term Evolution (LTE) or LTE-Advanced, or similar, follow-on wireless standards. Further, while several specific standards have been set forth herein as examples of suitable applications, implementations herein are not limited to any particular standard or protocol.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIG. 4 illustrates a process of precoding or beamforming data using a dynamically generated differential codebook as described herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Some implementations herein may be used to generate a second N×(N−M) codebook of a second rank (N−M) from a first N×M codebook of a first rank M. The first and second codebooks may be used by the stations for closed-loop MIMO precoding in any known manner. This second codebook is both orthogonal and complementary to the first codebook. In practice, this may reduce storage requirements in closed-loop MIMO beamforming, because the second codebook may be dynamically generated as needed by a base station and/or a mobile station. In some cases, a higher rank beamforming matrix or precoding matrix may be formed from a lower rank (e.g., one or two) beamforming matrix or precoding matrix. Also, a novel way to generate the rotation matrix $Q_{v(t-1)}$ is disclosed.

Figure 1:
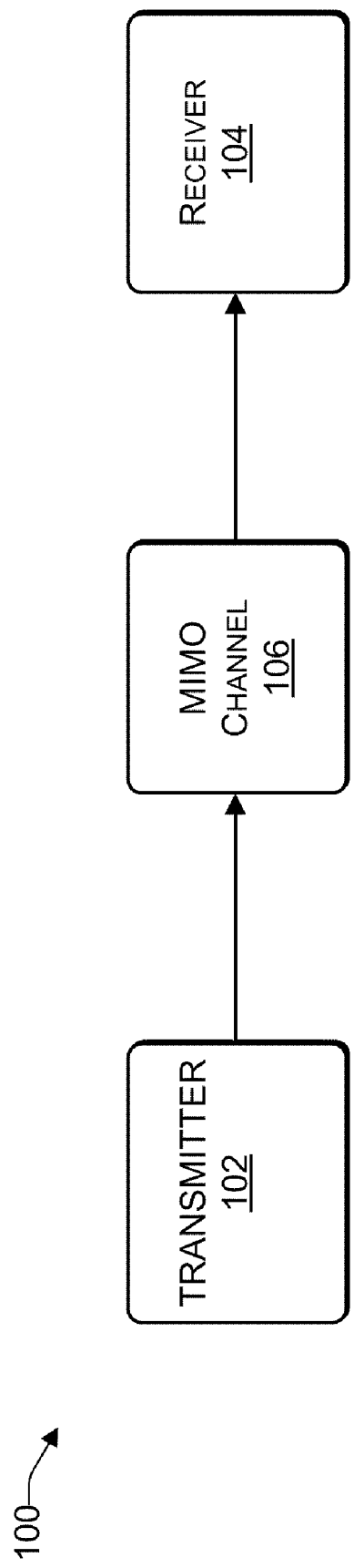
FIG. 1 illustrates an exemplary block diagram of a communications system according to some implementations disclosed herein.

FIG. 1 illustrates an exemplary block diagram of a communication system 100 according to some implementations herein. System 100 includes a transmitter 102 able to communicate with a receiver 104 through a MIMO channel 106. Optionally, transmitter 102 may be distortion-aware. Transmitter 102 is configured to receive a source to be transmitted. Transmitter 102, either implicitly or explicitly as explained further below, takes into account channel conditions during channel encoding via closed-loop feedback from the receiver 104. Transmitter 102 transmits the source over the MIMO channel to the receiver 104 according to a codeword chosen from among its codebooks based on a codeword index fed back from the receiver. The receiver 104 is configured to receive the MIMO transmission and reconstruct the transmission to generate a reconstructed source.

It should be noted that transmitter 102 may be either a base station (BS)/eNB or a mobile station (MS)/UE, and the receiver 104 may be the other of a base station/eNB or a mobile station/UE. As is the practice in closed-loop MIMO beamforming, either the BS or MS may determine (e.g., based on SINR or other channel goodness condition(s)) at which rank to transmit and receive information. For example, at a relatively low SINR, an N×1 scheme (i.e., rank 1) may be used to transmit all energy in a single stream, where if SINR improves to around 5 dB an N×2 (i.e., rank 2) configuration may be used. Similarly, if the SINR exceeds, for example 20 dB an N×3 (i.e., rank 3) scheme may be used to increase throughput. In any case, the BS and MS each may generate codebooks of the appropriate rank before transmission. Then feedback from a receiving device (e.g., the MS or the BS) in the form of a codeword index permits the transmitting device (e.g., the BS or the MS) to choose an appropriate codeword from its generated codebook for beamforming transmission.

As used herein, the terms "beamforming matrix" and "precoding matrix" may be interchanged. Technically, the former is the single-stream (i.e., rank 1) instance of the latter, but in a broader sense a precoding matrix shapes or forms the resultant output, even if there is not a single beam to be formed (i.e., for rank 2 or higher where there are multiple streams). Thus, in a general sense "beamforming" may refer to "precoding" herein, and vice versa.

Figure 2:
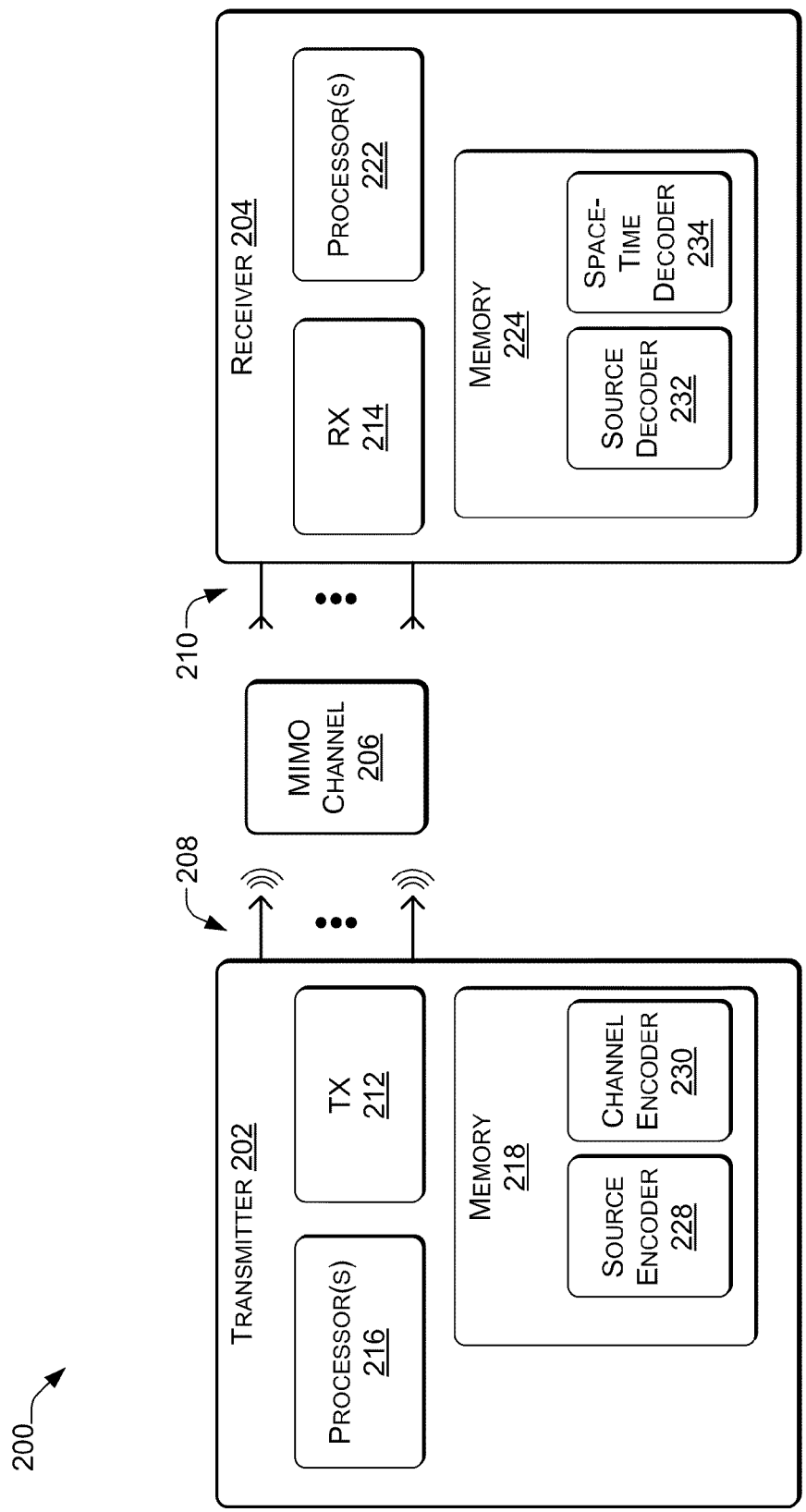
FIG. 2 illustrates a block diagram of an exemplary communication system according to some implementations.

FIG. 2 illustrates an example of a system 200 for closed-loop MIMO transmission according to some implementations. To this end, the system 200 includes a transmitter 202 configured to communicate wirelessly with a receiver 204 over a MIMO channel 206. Transmitter 202 includes a plurality of transmitter antennas 208 for MIMO communication with a plurality of receiver antennas 210 at receiver 204. Transmitter 202 also includes a transmitter circuit or device 212, such as a radio front end or other wireless transmission mechanism for transmitting signals over the MIMO channel 206. Similarly, receiver 204 may include a receiver circuit or device 214, such as a radio front end or other wireless receiving mechanism for receiving the signals from transmitter 202.

In addition, transmitter 202 may include one or more processors 216 coupled to a memory 218 or other processor-readable storage media. Similarly, receiver 204 may include one or more processors 222 coupled to a memory 224.

In some implementations, the processor(s) 216, 222 can be a single processing unit or a number of processing units, all of which may include multiple computing units or multiple cores. The processor(s) 216, 222 may be implemented as one or more microprocessors, microcomputers, microcontrollers, digital signal processors, central processing units, state machines, logic circuitries, and/or any devices that manipulate signals based on operational instructions. Among other capabilities, the processors 216, 222 can be configured to fetch and execute processor-executable instructions stored in the memories 218, 224, respectively, or other processor-readable storage media.

The memories 218, 224 can include any processor-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks, or the like, or any combination thereof. The memories 218, 224 store computer-readable processor-executable program instructions as computer program code that can be executed by the processors 216, 222, respectively, as a particular machine for carrying out the methods and functions described in the implementations herein. Further, memories 218, 224 may also include other program modules stored therein and executable by processor(s) 218, 222, respectively, for carrying out implementations herein, such codecs, or the like. For example, memory 218 may include a source encoder 228 and a channel encoder 230, as discussed above. Similarly, memory 224 may include a source decoder 232 and a space-time decoder 234, as discussed above. Memories 218, 224 may also include data structures, such as stored SNR vectors, lookup tables, MIMO MCS schemes, precoding matrices, and the like (not shown), as discussed above.

Additionally, transmitter 202 and receiver 204 may be implemented in a variety of devices and systems, such as cellular communications systems, Wi-Fi systems, or the like. For example, transmitter 202 might be incorporated in a mobile computing device, such as a cell phone, smart phone, laptop or the like, while receiver 204 might be implemented in a cell tower, wireless access point, a second computing device, or the like, or vice versa. Further, while exemplary system architectures have been described, it will be appreciated that other implementations are not limited to the particular system architectures described herein. For example the techniques and architectures described herein may in incorporated in any of a variety of wireless communication devices, and implementations herein are not limited to any type of communication devices.

In the downstream or downlink case, the generically-named transmitters 102 and/or 202 above may be interchangeably referred to as a base station (BS) or enhanced Node B (eNB) or access point (AP) at the system level herein. In this downlink case, the receivers 104 and/or 204 above may be interchangeably referred to as a mobile station (MS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS herein may also be seen as a reference to either of UE or STA.

A description of differential feedback is listed below. In the downlink, either the base station or the mobile station selects the number of streams, i.e. the rank of the beamforming matrix. Both the base station and the mobile station generate the same codebook according to the specification for the selected rank. The mobile station, for example, may feed back the index of the codeword, i.e. the selected beamforming matrix. The base station then looks up the beamforming matrix from the same codebook. In some cases, however, the base station may feed back the index of the codeword, i.e. the selected beamforming matrix. The mobile station may then look up the beamforming matrix from the same codebook.

Recap of 802.16m Differential Feedback:

The differential feedbacks exploit the correlation between precoding matrixes adjacent in time or frequencies. The feedback shall start initially and restart periodically by sending a one-shot feedback that fully depicts the precoder by itself. At least one differential feedback shall follow the start and restart feedback. The start and restart feedback employs the codebook defined for the base mode and is sent through long term report defined in Feedback Allocation A-MAP IE for MFM 3 and 6. The differential feedback is sent through short term report defined in Feedback Allocation A-MAP IE for MFM 3 and 6.

Denote the feedback index, the corresponding feedback matrix, and the corresponding precoder by t, D(t), and V(t), respectively. The sequential index is reset to 0 at $T_{max}+1$. The index for the start and restart feedbacks are 0. Let A be a vector or a matrix and $Q_A$ be the rotation matrix determined by A. The indexes of the subsequent differential feedbacks are 1, 2, . . . , $T_{max}$ and the corresponding precoders are:

$$V(t)=Q_{v(t-1)}D(t), \text{ for } t=0, 1, 2, \ldots, T_{max},$$

where the rotation matrix $Q_{v(t-1)}$ is a unitary $N_t \times N_t$ matrix computed from the previous precoder $V(t-1)$. $N_t$ is the number of transmit antennas. The dimension of the fed back matrix D(t) is $N_t \times M_t$, where $M_t$ is the number of spatial streams.

The $Q_{v(t-1)}$ has the form $Q_{v(t-1)}=[V(t-1)V^\perp(t-1)]$, where $V^\perp(t-1)$ consists of columns each of which has a unit norm and is orthogonal to the other columns of $Q_{v(t-1)}$. For $M_t=1$, where $V_{(t-1)}$ is a vector, $$Q_{V(t-1)} = \begin{cases} I - \frac{2}{\|\omega\|^2}\omega\omega^H, & \|\omega\| > 0 \\ I, & \text{otherwise,} \end{cases}$$

where $\|V(t-1)\|=1$ and $\omega=e^{-j\theta}V(t-1)-e_1$; $\theta$ is the phase of the first entry of $V(t-1)$; $e_1=[1\ 0\ \ldots\ 0]^T$. For $M_t > 1$, let $L=N_t-M_t$.

For computing $Q_{v(t-1)}$, L columns are appended to $V(t-1)$ forming a square matrix $M=[V(t-1)\ E]$ and the appended columns are $$E=[e_{\tau_1}\ldots e_{\tau_L}]$$

where $e_{\tau_j}$ is the $N_t \times 1$ vector whose entry on the $\tau_j$-th row is one and whose other entries are zeros.

$Q_{v(t-1)}$ is computed by orthogonalizing and normalizing the columns of M. The indexes $\tau_j$ for $j=1,\ldots L$ are selected for the numerical stability of the orthogonalization and normalization process. Let $$g=(|Re(V(t-1))|+|Im(V(t-1))|)\alpha,$$

where $\alpha$ is the $1 \times M_t$ vector with all entries equal to one; Re( ) and Im( ) take the real and imaginary parts of the input matrix, respectively; $||$ takes the absolute values of the input matrix entry by entry. The i-th row of the vector g has the sum of the absolute values of all the real and imaginary parts of $V(t-1)$ on the same row.

The entries of g are sorted in an increasing order. If $g_i=g_j$ and $i<j$, then $g_i<g_j$ is used in the order list. The order list is $$g_{k_1} < \ldots < g_{k_{N_t}},$$

where $k_i$ for $i=1,\ldots,N_t$ are row indexes of g. The first L indexes in the list are assigned to the indexes $\tau_j$ in E as $$\tau_j=k_j, \text{ for } j=1,\ldots,L.$$

The Gram-Schmidt orthogonalization and a normalization process are applied on the last L columns of M column by column and result in $Q_{v(t-1)}$ as

---

```
For j = 1:L
    For k = 1 : j + M_t - 1
        m_{j+M_t} = m_{j+M_t} - m_{τ_j,k}* m_k
    End
    m_{j+M_t} = m_{j+M_t} / ||m_{j+M_t}||
End
Q_{V(t-1)} = M
```
--- where $M^*_{\tau_j,k}$ is the conjugate of M's entry on the $\tau_j$-th row and k-th column.

The feedback matrix D(t) is selected from a differential codebook. Denote the codebook by $D(N_t, M_t, N_w)$, where $N_w$ is the number of codewords in the codebook. Denote $D_i(N_t, M_t, N_w)$ the $i^{th}$ codeword of $D(N_t, M_t, N_w)$. The rotation matrixes $Q_D(N_t,M_t,N_w)$ s of the $D_i(N_t, M_t, N_w)$ comprises a set of $N_t$ by $N_t$ matrices that is denoted by $Q_{D(Nt, Mt, Nw)}$.

The differential codebook $D(4,3,N_w)$ is computed from $Q_{D(4,1,Nw)}$. The $i^{th}$ codeword of $D(4,3,N_w)$ denoted by $D_i(4,3,N_w)$ is computed as $$D_i(4, 3, N_w) = \begin{bmatrix} 0 & 1 & 0 & 0 \\ 0 & 0 & 1 & 0 \\ 0 & 0 & 0 & 1 \\ 1 & 0 & 0 & 0 \end{bmatrix} \tilde{Q}_i(4, 1, N_w),$$

where $\tilde{Q}_i(4,1,N_w)$ consists of the last three columns of the $i^{th}$ matrix in $Q_{D(4,1,Nw)}$. The differential codebook $D(4,4,N_w)$ is computed from $Q_{D(4,2,Nw)}$. The $i^{th}$ codeword of $D(4,4,N_w)$ is the $i^{th}$ matrix in $Q_{D(4,2,Nw)}$.

The differential codebooks $D(8,5,N_w)$, $D(8,6,N_w)$, and $D(8,7,N_w)$ are computed from $D(8,3,N_w)$, $D(8,2,N_w)$, and $D(8,1,N_w)$, respectively. The $i^{th}$ codewords $D_i(8,5,N_w)$, $D_i(8,6,N_w)$, and $D_i(8,7,N_w)$ of $D(8,5,N_w)$, $D(8,6,N_w)$, and $D(8,7,N_w)$ are computed, respectively as $$D_i(8, 5, N_w) = \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \end{bmatrix} \tilde{Q}_i(8, 3, N_w),$$

$$D_i(8, 6, N_w) = \begin{bmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \end{bmatrix} \tilde{Q}_i(8, 2, N_w),$$

$$D_i(8, 7, N_w) = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \end{bmatrix} \tilde{Q}_i(8, 1, N_w),$$

where $\tilde{Q}_i(8, k, N_w)$ consists of the last 8-k columns of the $i^{th}$ matrix in $Q_{D(8,k,Nw)}$. The differential codebook $D(8,8,N_w)$ is computed from $D(8,4,N_w)$. The $i^{th}$ codeword of $D(8,8,N_w)$ is the $i^{th}$ matrix in $Q_{D(8,4,Nw)}$.

Two aspects of the invention herein should be noted. The first aspect is the complementary relationship between the $N_t \times M_t$ codebook and the $N_t \times (N_t-M_t)$ codebook. The second aspect is the efficient computation of complementary expansion, i.e. adding complementary and orthogonal columns to a given vector or matrix. This computation is employed for computing $Q_{v(t-1)}$ and $\tilde{Q}_i(N_t,k,N_w)$.

For the first aspect, the inventors have discovered a complementary relationship between partial rank codebooks. That is, the subspace (also called range) spanned by a codeword of an $N_t \times M_t$ codebook may be orthogonal and complementary to the subspace (or range) a codeword of an $N_t \times (N_t-M_t)$ codebook. For clarity, here $N_t$ is the number of antennas and $M_t$ is a first rank or number of transmit streams. Hence, the quantity $(N_t-M_t)$ defines a second rank or number of streams that, when added to $M_t$, results in a full rank (e.g., number of streams equal to the number of antennas N). Therefore, the $N_t \times (N_t-M_t)$ codebook can be generated from the $N_t \times M_t$ codebook. Although the number of codewords in both codebooks may not be the same, it should still be noted that a subset of the $N_t \times (N_t-M_t)$ codebook can be generated from a subset of the $N_t \times M_t$ codebook. The steps are outlined below and some are shown conceptually as process 300 in FIG. 3.

First, pick a codeword $D_{N \times M}$ from the $N_t \times M_t$ codebook. Next append $N_t - M_t$ columns to $D_{N \times M}$ such that the appended columns are orthogonal to the columns of $D_{N \times M}$ [act 310]. The appended $N_t - M_t$ columns form a matrix $\tilde{D}_{N \times (N-M)}$.

Rotate $\tilde{D}_{N \times (N-M)}$ by an $N_t \times N_t$ so that the rotated $N_t \times (N_t - M_t)$ codebook is at a desired location [act 320]. The desired location is that orientation (shown in FIG. 3 as a polar north or top direction) as that of the $N_t \times M_t$ codebook.

This scheme of generating a complementary differential codebook may be illustrated mathematically, in addition to that shown in FIG. 3, as follows.

$$D_{N \times M} \xrightarrow{\text{Complementary expansion}} Q = [D_{N \times M} \ \tilde{D}_{N \times (N-M)}] \xrightarrow{\text{Rotation}} \tilde{D}_{N \times (N-M)}$$

$$= R_{N \times N} \tilde{D}_{N \times (N-M)}$$

For example, the original codeword $$D_{N \times M} = \begin{bmatrix} 1 \\ 0 \\ 0 \end{bmatrix}.$$

The appended columns form $$\tilde{D}_{N \times (N-M)} = \begin{bmatrix} 0 & 0 \\ 1 & 0 \\ 0 & 1 \end{bmatrix}.$$

Since $$\begin{bmatrix} 1 \\ 0 \\ 0 \end{bmatrix}$$

is usually the center of the original codebook and $$\begin{bmatrix} 1 & 0 \\ 0 & 1 \\ 0 & 0 \end{bmatrix}$$

is the center of the complementary codebook, we need to rotate $$\tilde{D}_{N \times (N-M)} = \begin{bmatrix} 0 & 0 \\ 1 & 0 \\ 0 & 1 \end{bmatrix} \text{ to } \begin{bmatrix} 1 & 0 \\ 0 & 1 \\ 0 & 0 \end{bmatrix}.$$

For this example, the rotation matrix can be $$R_{N \times N} = \begin{bmatrix} 0 & 1 & 0 \\ 0 & 0 & 1 \\ 1 & 0 & 0 \end{bmatrix}.$$

In general, the rotation matrix has a block diagonal structure and can be $$R_{N_t \times N_t} = \begin{bmatrix} & I_{N_t - M_t} \\ I_{M_t} & \end{bmatrix},$$

where $I_K$ is the K by K identity matrix. If the differential codebook is uniformly distributed in the unitary matrix set, then the rotation step can be skipped. In addition, if the differential codebook is symmetric about a center, then rotation matrix R is applicable. Otherwise, other rotation matrices may be used if desired to achieve similar aims.

Figure 3:
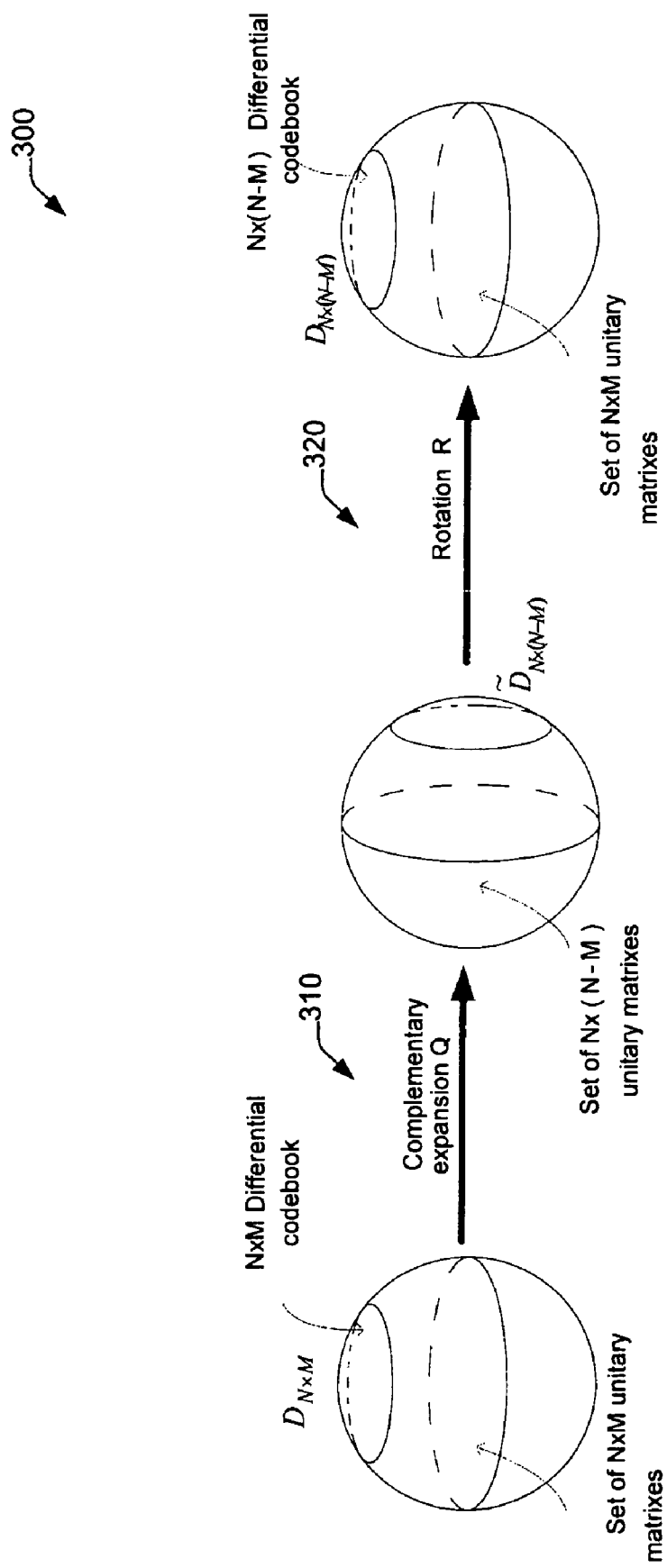
FIG. 3 illustrates a conceptual process of forming an N×(N−M) codebook from an N×M codebook as described herein.

For the second aspect, the computation of $Q_{v(t-1)}$ is also the complementary expansion Q in FIG. 3 and $\tilde{Q}_i(N_t, k, N_w)$ described above. The $N_t - M_t$ appended columns are not unique and the different options only differ by a $(N_t - M_t) \times (N_t - M_t)$ rotation matrix as $\tilde{D}_{N \times (N-M), \text{option 1}} = \tilde{D}_{N \times (N-M), \text{option 2}} Q_{(N-M) \times (N-M)}$, where $Q_{(N-M) \times (N-M)}$ is the $(N_t - M_t) \times (N_t - M_t)$ rotation matrix. For efficient computation of $Q_{v(t-1)}$ or Q in FIG. 3, we first append $L = N_t - M_t$ vectors with a single one in the entries and then orthogonalize the appended matrix as follows. The single one in each vector reduces the number of multiplications.

For computing $Q_{v(t-1)}$, L columns are appended to V(t−1) forming a square matrix M=[V(t−1) E] and the appended columns are $$E = [e_{\tau_1} \ldots e_{\tau_L}]$$

where $e_{\tau_j}$ is the $N_t \times 1$ vector whose entry on the $\tau_j$-th row is one and whose other entries are zeros. $Q_{v(t-1)}$ is computed by orthogonalizing and normalizing the columns of M. The indexes $\tau_j$ for j=1, . . . , L are selected for the numerical stability of the orthogonalization and normalization process.

Let $$g = (|Re(V(t-1))| + |Im(V(t-1))|)a,$$

where $\alpha$ is the $1 \times M_t$ vector with all entries equal to one; Re( ) and Im( ) take the real and imaginary parts of the input matrix, respectively; || takes the absolute values of the input matrix entry by entry. The i-th row of the vector g has the sum of the absolute values of all the real and imaginary parts of V(t−1) on the same row.

The entries of g are sorted in an increasing order. If $g_i = g_j$ and i<j, then $g_i < g_j$ is used in the order list. The order list is $$g_{k_1} < \ldots < g_{k_{N_t}},$$

where $k_i$ for i=1, . . . , $N_t$ are row indexes of g. The first L indexes in the list are assigned to the indexes $\tau_j$ in E as $$\tau_j = k_j, \text{ for } j=1, \ldots, L.$$

The Gram-Schmidt orthogonalization and a normalization process are applied on the last L columns of M column by column and result in $Q_{v(t-1)}$ as $$\begin{aligned}
&\text{For } j = 1{:}L \\
&\quad \text{For } k = 1{:}j + M_t - 1 \\
&\quad\quad m_{j+M_t} = m_{j+M_t} - m_{\tau_j,k}^* m_k \\
&\quad \text{End} \\
&\quad m_{j+M_t} = \frac{m_{j+M_t}}{\|m_{j+M_t}\|} \\
&\text{End} \\
&Q_{\nu(t-1)} = M
\end{aligned}$$

where $m^*_{\tau_j,k}$ is the conjugate of M's entry on the $\tau_j$-th row and k-th column.

FIG. 4 illustrates a process 400 of precoding or beamforming data using a dynamically generated differential codebook as described herein. Either the BS or MS (or one of their counterpart UE or eNB) may decide to change the rank of beamforming matrix used in closed loop MIMO beamforming (or precoding) [act 402]. For example, channel conditions (e.g., SINR) may sufficiently improve by 5, 10, or 20 dB such that the BS or MS decides to change the rank from a lower number (e.g., one data stream) to a higher rank (e.g., three streams for a four antenna case).

Both the BS and MS may obtain differential codebooks of a complementary rank [act 404]. In some implementations, these codebooks of, for example, rank 1 or 2 may be stored in a memory in the BS and MS, the storage size being relatively small.

Then the BS and MS may each generate codebooks of the new rank via the complementary process described herein [act 406]. Sometimes this new rank will be higher than the complementary rank. In some implementations, the new differential codebooks may be stored locally in a dynamic memory for as long as they are needed.

Depending on which station is transmitting and which is receiving, the BS or MS may receive or transmit an index telling the other station which codeword to use for precoding from the new codebook for closed-loop MIMO data transmission [act 408]. Again depending on which station is transmitting and which is receiving, the BS or MS may receive or transmit data precoded with the codeword corresponding to the index transmitted or received in act 408 [act 410]. This is how the codebook and rotation matrix generation schemes described herein are used in closed loop MIMO beamforming (or precoding).

Thus the scheme herein may be used to generate a second N×(N−M) codebook of a second rank (N−M) from a first N×M codebook of a first rank M. This second codebook is both orthogonal and complementary to the first codebook. In practice, this may reduce storage requirements in closed-loop MIMO beamforming, because the second codebook may be dynamically generated as needed by a base station and/or a mobile station. In some cases, a higher rank beamforming matrix or precoding matrix may be formed from a lower rank (e.g., one or two) beamforming matrix or precoding matrix. Also, a novel way to generate the rotation matrix $Q_{\nu(t-1)}$ is disclosed.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention. For example, any or all of the acts in FIG. 3 or 4 or similar described processes may be performed as a result of execution by a computer (or processor or dedicated logic) of instructions embodied on a computer-readable medium, such as a memory, disk, etc.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of performing codebook-based precoding comprising:
    obtaining at least part of a first differential codebook having a first rank;
    generating at least part of a second differential codebook having a second rank from the first differential codebook;
    receiving an index into the second differential codebook from a remote station via at least one of a plurality of antennas; and
    precoding data for transmission via the plurality of antennas using a codeword chosen from the second differential codebook based on the index.

2. The method of claim 1, wherein the obtaining includes reading the first differential codebook from a memory.

3. The method of claim 1, wherein the first rank is one or two or greater, and
    wherein the second rank is a difference between a number of the plurality of antennas and the first rank.

4. The method of claim 1, wherein the second rank is greater than the first rank.

5. The method of claim 1, further comprising:
    storing the second differential codebook in a memory.

6. The method of claim 1, wherein the generating includes:
    performing a complementary expansion on the first differential codebook to generate an intermediate codebook having the second rank; and
    rotating the intermediate codebook to generate the second differential codebook.

7. A non-transitory processor-readable storage media containing processor-executable instructions for execution by a processor for carrying out the method of claim 1.

8. A method of performing codebook-based, closed-loop transmission via N antennas, where N is an integer two or greater, comprising:
    providing an N×M differential codebook, where M is an integer number of data streams that is less than N;
    generating an N×(N−M) differential codebook from the N×M differential codebook, including:
        performing a complementary expansion of the N×M differential codebook; and
    precoding (N−M) streams of data for transmission via the N antennas using a codeword chosen from the N×(N−M) differential codebook.

9. The method of claim 8, wherein the providing includes reading the N×M differential codebook from a memory.

10. The method of claim 8, wherein M is one or two or greater.

11. The method of claim 8, wherein N is two, three, four, or eight.

12. The method of claim 8, further comprising:
    storing the N×(N−M) differential codebook in a memory.

13. The method of claim 8, wherein the generating includes:
    rotating an intermediate matrix produced by the complementary expansion of the N×M differential codebook.

14. A non-transitory processor-readable storage media containing processor-executable instructions for execution by a processor for carrying out the method of claim 8.

* * * * *